United States Patent
Mihirogi

Patent Number: 5,178,037
Date of Patent: Jan. 12, 1993

[54] CENTERING AND FIXING APPARATUS

[75] Inventor: Kiyoshi Mihirogi, Odawara, Japan

[73] Assignee: HSST Corporation, Tokyo, Japan

[21] Appl. No.: 776,119

[22] Filed: Oct. 15, 1991

[30] Foreign Application Priority Data

Oct. 19, 1990 [JP] Japan ................................. 2-280774

[51] Int. Cl.⁵ ..................... F16H 53/06; B23B 23/02; G05G 1/04
[52] U.S. Cl. ........................................ 74/569; 82/170; 384/151; 464/173; 74/526
[58] Field of Search ............... 82/170 X; 74/569, 567, 74/526, 527; 384/146, 151 X, 447; 464/57, 173 X

[56] References Cited

U.S. PATENT DOCUMENTS

| | | | |
|---|---|---|---|
| 39,608 | 8/1863 | Williams | 82/170 |
| 3,279,446 | 10/1966 | Rappa | 74/569 |
| 3,832,022 | 8/1974 | Reinsma et al. | 384/146 |
| 3,940,932 | 3/1976 | Ambrose et al. | 74/569 |
| 3,986,529 | 10/1976 | Pfarrwaller | 74/569 |
| 4,109,584 | 8/1978 | Mihirogi | 104/130 |
| 4,305,596 | 12/1981 | Unterstrasser | 464/173 |
| 4,716,939 | 1/1988 | Palau | 74/569 |
| 4,761,083 | 8/1988 | Smith et al. | 384/146 X |
| 4,969,368 | 11/1990 | Sekine et al. | 74/569 |

FOREIGN PATENT DOCUMENTS

| | | | |
|---|---|---|---|
| 497244 | 4/1930 | Fed. Rep. of Germany | 74/569 |
| 3408869 | 9/1985 | Fed. Rep. of Germany | 82/170 |
| 1101917 | 10/1955 | France | 74/569 |
| 60-30801 | 7/1985 | Japan . | |
| 62-185919 | 8/1987 | Japan | 74/526 |
| 2222651 | 3/1990 | United Kingdom | 74/569 |

Primary Examiner—Vinh T. Luong
Attorney, Agent, or Firm—Jordan and Hamburg

[57] ABSTRACT

A centering and fixing apparatus for a movable element includes a swing arm that is pivoted on a fixed base member for movement in a vertical plane. A fixing arrangement is mounted on the swing arm. The movable element includes a centering arrangement adapted to engage the fixing arrangement. The centering arrangement includes a pair of centering rollers spaced apart a predetermined distance in a direction perpendicular to the swinging plane of the swing arm. The fixing arrangement includes a single roller with a diameter larger than the distance between the centering rollers. The single roller is supported on the swing arm via a spherical bearing arrangement, and is positioned to simultaneously contact the centering rollers.

6 Claims, 5 Drawing Sheets

CENTERING AND FIXING APPARATUS

BACKGROUND OF THE INVENTION

1. Field of the Invention

The present invention relates to a positioning and fixing apparatus for positioning a movable member such as a switch girder for a linear motor car of the levitation type in a predetermined position and fixing it thereat.

2. Background of the Invention

An apparatus for positioning a girder of a linear motor car of the levitation type in a predetermined position at which it is switched and holding it thereat, as shown in FIGS. 6 and 7, comprises centering means 102 fixed to a movable member 101 i.e., a switch girder and a roller 105 provided on a swing arm 104 pivoted in a vertical plane by a stationary base 103. When the movable member 101, movable linearly or swingeable by means of wheels 107 guided by rails 106, approaches in the vicinity of the predetermined position and is then stopped thereat, the swing arm 104 is swung down by an oil cylinder 108. The centering means 102 is formed, as shown in FIG. 7, of a guide member comprising a groove 109 fittingly receiving a roller 105 which serves as a fixing means provided on the swing arm 104, and a chute shaped guide groove 110 guides the roller 105 into the groove 109. Upon swinging down of the swing arm 104, the roller 105 enters into the groove 109 through the guide groove 110 and the movable member 101 is centered and fixed thereat.

In the conventional centering means described above, the roller 105 which serves as the fixing means is forcibly pushed into the groove 109 of the centering means 102. Therefore, there is a problem that abrasion between the roller 105 and the wall material of the groove 109 may occur. Once such abrasion occurs, a precise centering operation becomes impossible and repair thereof is very difficult. In view of this, an extra centering means is always required so that it can be exchanged depending upon the degree of abrasion. This means an increased cost.

SUMMARY OF THE INVENTION

An object of the present invention is, therefore to provide a centering and fixing apparatus for a movable member, which is capable of preventing centering accuracy from becoming worse due to abrasion.

Another object of the present invention is to provide a centering and fixing apparatus in which a fixing means and a centering means are in rolling contact with each other, so that a contact face thereof is always changed with minimum friction therebetween. Especially, when the movable member is a longer steel structure such as a truck girder, a sliding mechanism is provided compensating for thermal expansion or contraction so that a relative discrepancy is absorbed and function is minimized.

A further object of the present invention is to provide a centering and fixing apparatus in which a fixing means can be pushed into a predetermined position with slight force and an accurate and rigorous centering and fixing effect is achieved.

A still further object of the present invention is to make a centering and fixing apparatus that is an easily available part, eliminating the necessity of preparation and stocking of any extra part thereof.

According to the present invention, the above mentioned objects are achieved by providing a centering and fixing apparatus comprising fixing means provided on a swing arm supported rotatably in a vertical plane by providing a, fixed base member and centering means mounted on a movable member and engageable with the fixing means. The centering means includes a pair of centering rollers mounted, rotatably with a predetermined distance therebetween in a direction perpendicular to a swinging plane (vertical plane) of the swing arm. The fixing means comprises a single roller having diameter larger than the distance between the paired rollers, and rotatably supported by the swing arm through a spherical bearing means. The fixing means can be brought into contact with the paired rollers.

In the present invention, the roller which serves as the fixing means passes between the paired centering rollers rotatably supported by the movable member when the swing arm is swung down. Since the centering rollers are arranged with the distance therebetween in the direction perpendicular to the swinging plane of the swing arm, the fixing roller is brought into contact with the fixing rollers while it moves through them. If the fixing roller contacts only either of the centering rollers, the fixing roller pushes the movable member through the centering roller and centering of the movable member is obtained at a position where both the centering rollers contact the fixing roller simultaneously. The diameter of the fixing roller is slightly larger than a distance between surfaces of the centering rollers and therefore the fixing roller can not pass through between the centering rollers. The movable member is held and fixed in the centered position with pressure contact of the fixing roller with the centering rollers.

DETAILED DESCRIPTION OF THE PREFERRED EMBODIMENT

Figure 1:
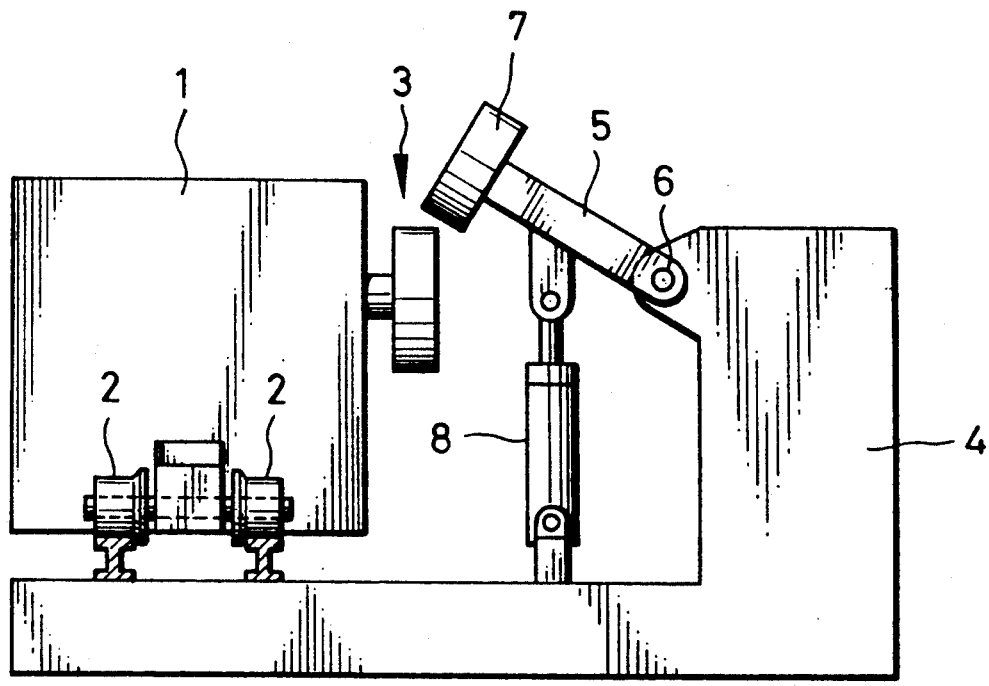
FIG. 1 is a front view of a switch girder provided with a centering and fixing apparatus according to the present invention.

The present invention is described in detail with reference to an embodiment shown in the drawings.

In FIG. 1, a movable member 1 such as a switch girder of a linear motor car of the levitation type is guided linearly or swingingly by a guide member 2.

A centering means 3 is mounted on the movable member 1 and a swing arm 5 is supported by a fixed base 4 via a shaft 6 rotatable in a vertical plane. A fixing means 7 is provided at a top portion of the swing arm 5. The swing arm 5 is drived by an oil pressure cylinder 8 to swing in the vertical plane. An electrically driven cylinder may be used instead of the hydraulic cylinder.

Figure 2:
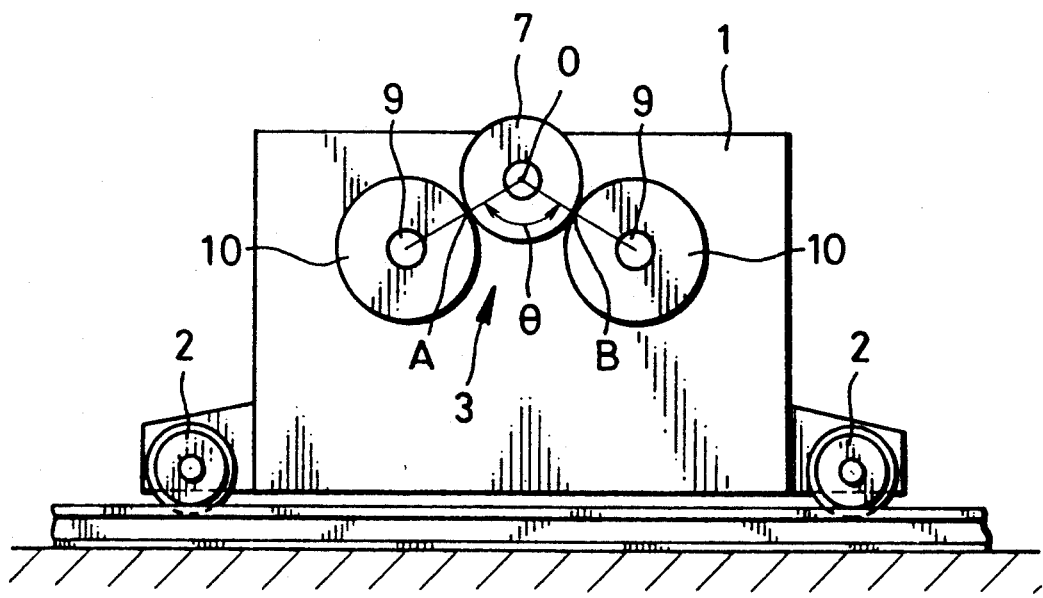
FIG. 2 is a side view of the centering and fixing apparatus in FIG. 1 with its base removed.

As shown in FIG. 2, the centering means 3 is comprised of a pair of centering rollers 10 rotatably supporting the movable member 1 through shafts 9, respectively. The centering rollers 10 are arranged horizontally with a predetermined space therebetween along a line perpendicular to the vertical plane in which the swing arm 5 can swing.

The fixing means 7 is comprised of with a roller supported rotatably by the swing arm 5. The diameter of the fixing roller 7 is slightly larger than a distance between the centering rollers 10 such that when it contacts both of the centering rollers 10 the movable member 1 is prevented from moving further.

Figure 3:
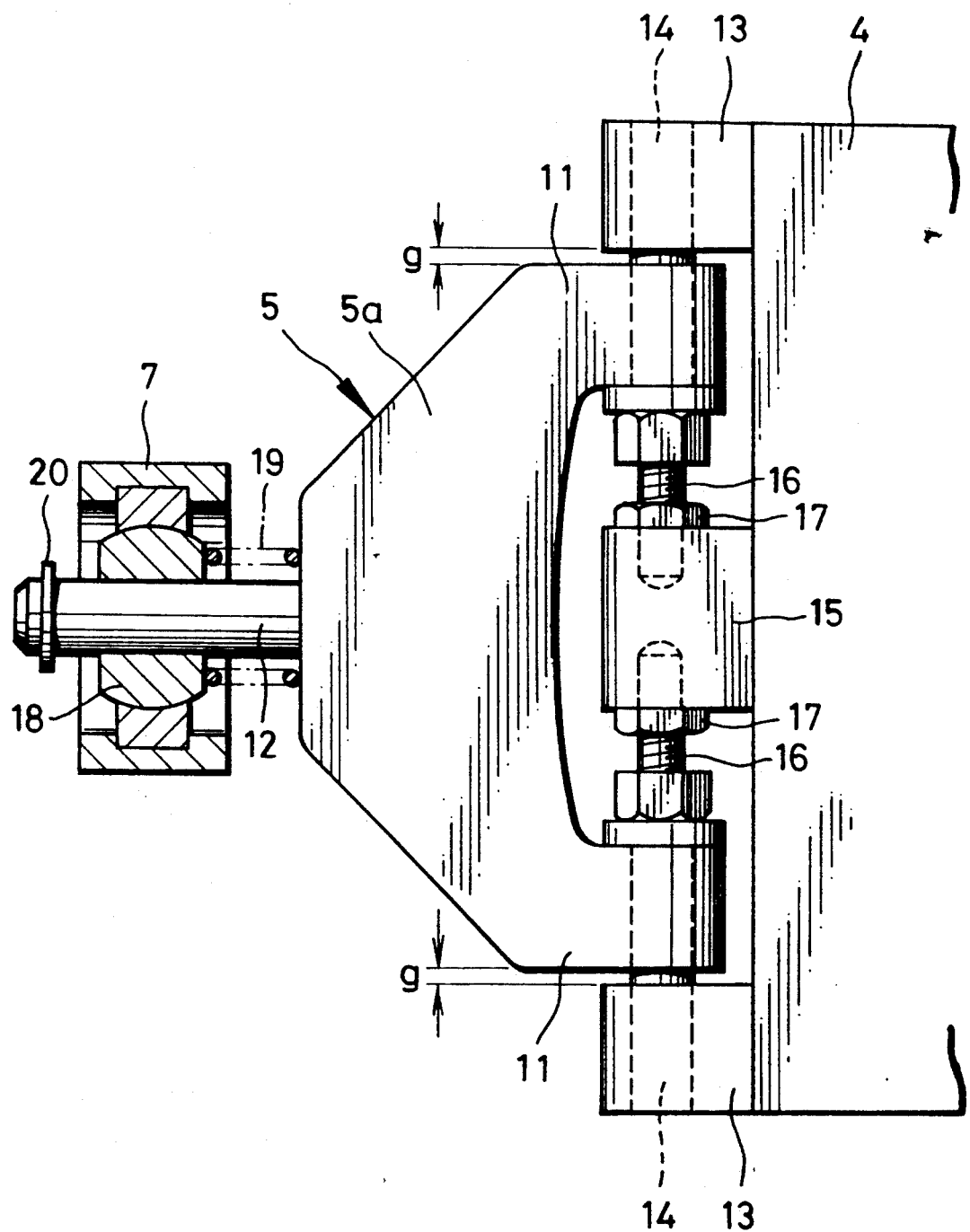
FIG. 3 is a plan view of a fixing means according to the present invention.

The swing arm 5 includes an arm body 5a having two arm portions 11 and a shaft portion 12, as shown in FIG. 3. The respective arm portions 11 are vertically rotatably supported by bearings 13 fixed to the base 4 through shafts 14. A gap g is provided between the arm portion 11 and each of the bearings 13 so that the swing arm 5 can be slightly shifted in the direction of the shafts 14.

A bracket 15 is fixed to the base 4 at an intermediate position between the bearings 13, that is, an intermediate position of the swing arm 5. Expanding bolts 16 are screwed in both sides of the bracket 15 and they are locked in predetermined adjusting positions by means of lock nuts 17. The adjusting bolts 16 are coaxially arranged with heads thereof being in contact with the arm portions 11 of the swing arm 5. Consequently, it becomes possible to adjust the arm body 5a positionally in the axial direction of the swing shaft 14 by means of the adjusting bolts 16 while the heads thereof are kept in contact with the arm portion 11.

Figure 4:
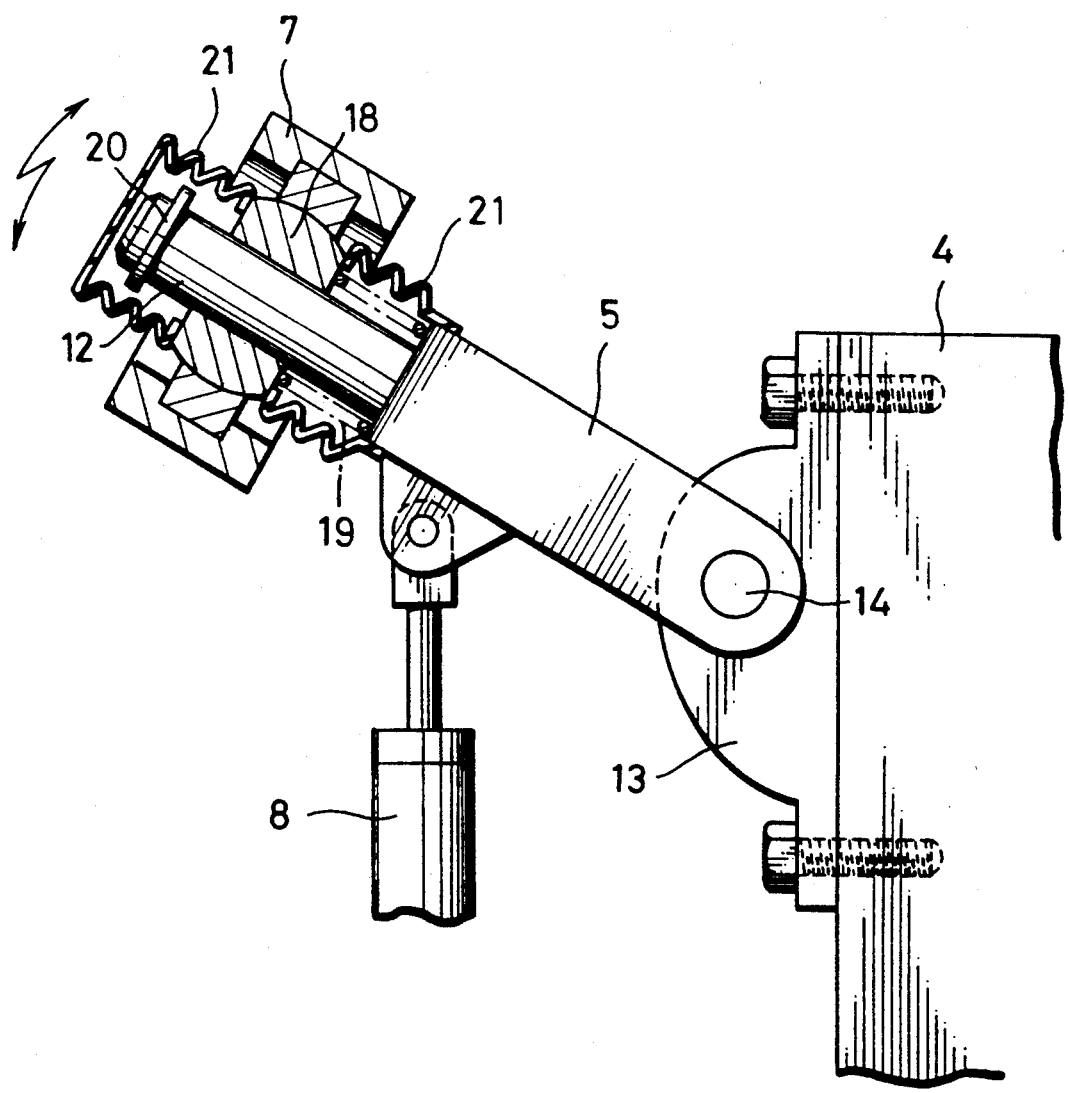
FIG. 4 is a partial cross section of the means shown in FIG. 3.

As shown in FIG. 4, a spherical bearing 18 is slidably supported by a shaft portion 12 of the swing arm 5 and the fixing roller 7 is supported by the spherical bearing 18 slidably along its spherical surface. When the swing arm 5 swings, the spherical bearing 18, together with the roller 7, is slidable along the shaft portion 12 by gravity within a predetermined range determined by a spring 19 provided between the arm body 5a and the spherical bearing 18. In order to prevent the spherical bearing 18 from dropping off of the shaft portion 12, a stop ring 20 such as a C-ring is mounted on a top end portion of the shaft portion 12. In order to ensure that the slidability of the spherical bearing 18 with respect to the shaft portion 12 is not degraded by dust, etc., and smooth sliding thereof is alway realized, a bellows type cover 21 is provided at the front and the rear of the spherical bearing 18 along the shaft portion 12, as shown in FIG. 4, to shield the shaft portion 12 against external dust. By ensuring that the spherical bearing 18 is smoothly slid along the shaft portion 12, there is no sliding friction and hence abrasion between the fixing means 7 and the centering means 10 even if the relative position between the movable member 1 and the base 4 is shifted due to thermal expansion or contraction.

Figure 5A:
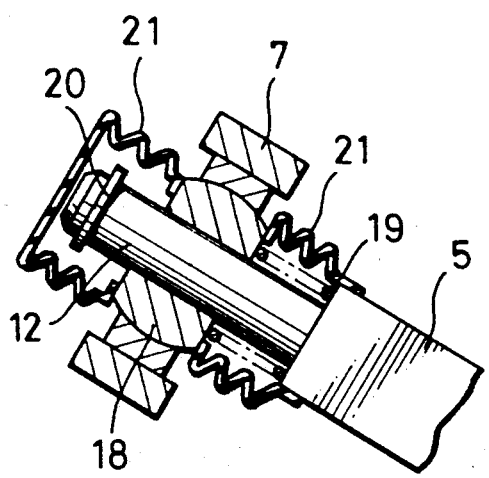
FIGS. 5a-5d show relative positions of the fixing means to the centering means during a downward swing of the swing arm.

When the swing arm 5 swings down, the roller 7 and the spherical bearing 18 is in a position shown in FIG. 5a with respect to the shaft 12 in which a component of gravitational force exerted on them in the axial direction of the shaft 12 and reactive force of the spring 19 are balanced. In FIGS. 5a to 5d, the roller 7 is shown in a different shape from the one in FIGS. 3 and 4 for simplification. When the arm 5 is further moved down, the roller 7 approaches the centering rollers 10 and eventually point-contacts with them as shown in FIG. 5b. Since, during the movement of the swing arm 5 from the position shown in FIG. 5a to the position shown in FIG. 5b, the force component of the roller 7 and the spherical bearing 18 in the axial direction of the shaft 12 decreases, the spring 19 expands and thus the roller 7 and the spherical bearing 18 are moved toward a free end of the shaft portion 12, with a sufficient gap l being kept between the stop ring 20 and the roller 7 on the spherical bearing 18.

Figure 5C:
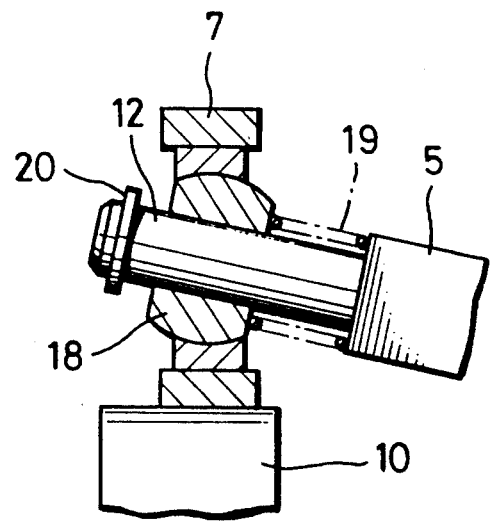
Figure 5B:
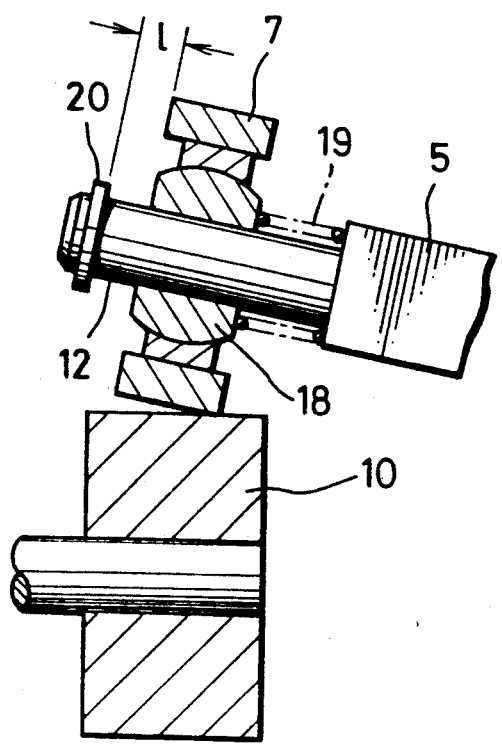
Figure 5D:
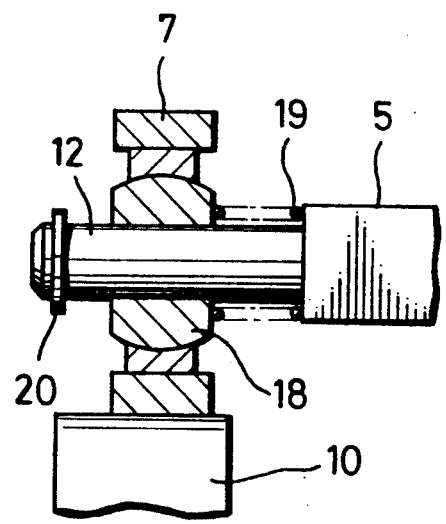
Figure 6:
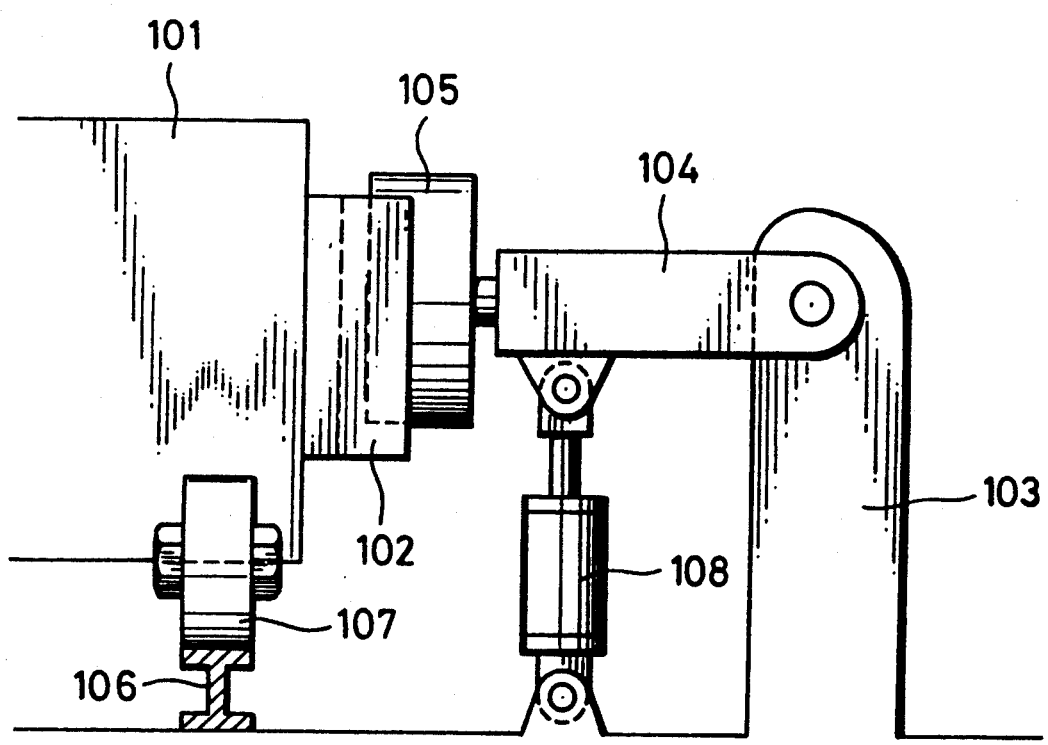
FIG. 6 is a front view of a conventional apparatus.
Figure 7:
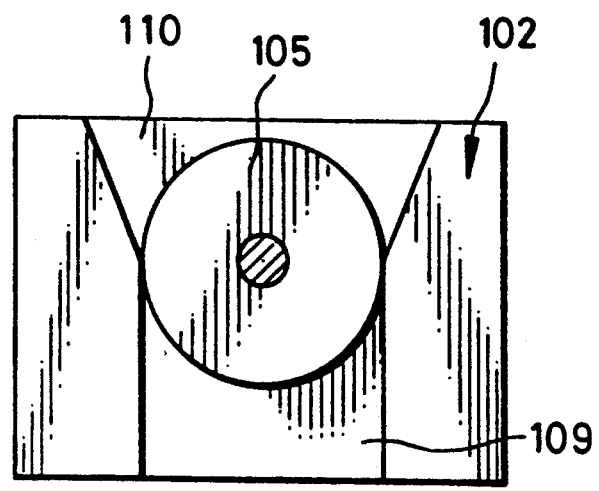
FIG. 7 is a side view of the apparatus of FIG. 6

When the swing arm 5 further moves after the roller 7 is brought into contact with the centering rollers 10, the roller 7 slides along the sphere of the spherical bearing 18 and the contact between the roller 7 and the centering rollers 10 comes a line contact as shown in FIG. 5c. Thus, the roller 7 is moved down while tilting slightly with respect to the shaft portion 12. At a time when the roller 7 comes into contact with both the centering rollers 10 simultaneously as shown in FIG. 5d, a centering of the movable member 1 with respect to the base 4 is achieved. When the roller 7 comes to contact with either centering roller 10, the swing arm 5 is moved down further from the position shown in FIG. 5c while the roller 7 rotates relative to the centering roller 10 contacted with the roller 7, during which the movable member 1 is pushed sideward, and, when the roller 7 contacts both centering rollers 10, the movable member 1 comes to a stop thereat and the centering is completed.

It is preferably that the swing arm 5 becomes substantially horizontal when the movable member 1 is in the position in which the movable member 1 is centered.

During the movement of the swing arm 5 moves from the position shown in FIG. 5c to that shown in FIG. 5d, there is no relative axial movement between the roller 7 and the centering rollers 10, although the spherical bearing 18 moves slightly along the shaft portion 12 in an opposite direction to the stop ring 20, against the force of the spring 19.

When the fixing roller 7 contacts the centering rollers 10 and engages them in a wedge relation thereto, the movable member 1 is reliably held in the centered position. In order to make the fixed state reliable, it is necessary that the engagement between the fixing means and the centering means can not be broken by a small external force exerted on the movalbe member 1. To this end, the diameter of the fixing roller 7 is selected such that the angle between lines connecting a center O of the roller 7 to contact points A and B thereof with the centering rollers 10 is as close to 180° as possible.

When the movable member 1 is to be moved, the swing arm 5 should be lifted up to a position in which the roller 7 can not collide with the centering rollers 10 when the latter are moved.

What is claimed is:

1. An apparatus for centering and holding a movable member, comprising:

fixing means provided on a swing arm supported for rotation in a vertical plane by a fixed base member, whereby said swing arm is swingable in said plane; and a movable centering means including a pair of parallel centering rollers, and means for mounting said rollers with a predetermined distance therebetween in a given direction, said direction being perpendicular to said vertical plane;

said fixing means comprising a single roller having diameter larger than said distance between said centering rollers, a spherical bearing on said swing arm, said single roller being rotatably supported by said swing arm on said spherical bearing means, said means for positioning comprising means for positioning said parallel rollers at a position wherein said fixing means simultaneously contacts both rollers of said pair of centering rollers.

2. The centering and fixing apparatus of claim 1, wherein said spherical bearing means is supported on said swing arm to be movable in an axial direction of said swing arm, and further comprising a spring positioned between said spherical bearing means and said swing arm, said spring having a spring force sufficient to hold said spherical bearing means and said single roller in a position within a predetermined range of positions against a component of gravitational force exerted on said spherical bearing means and said single roller in the axial direction of said swing arm in response to tilting of said swing arm to a tilted position, said spherical bearing means being spaceed from a free end portion of said swing arm when said swing arm is in a horizontal position.

3. The centering and fixing apparatus of claim 1, wherein said swing arm includes a pair of arm portions rotatably supported by bearings on said base, and comprising a bracket on said base at an intermediate position between said arm portions, a pair of coaxial adjusting bolts screwed into opposite sides of said bracket, said adjusting bolts being in contact with said arm portions to enable an adjustment of position of said swing arm possible.

4. The centering and fixing apparatus of claim 1, wherein said single roller has a diameter such that an angle between lines connecting the center of said single roller to contact points with said centering rollers is substantially 180°.

5. The centering and fixing apparatus of claim 1, comprising cover members coupled between said spherical bearing means and said swing arm for shielding said spherical bearing means.

6. The centering and fixing apparatus of claim 1, wherein said single roller is mounted on said spherical bearing means to linearly contact both of said centering rollers in a range of angular displacements of the swing arm.

* * * * *